United States Patent Office 3,462,413
Patented Aug. 19, 1969

3,462,413
14,21-OXIDONORCHOLAN-23-OIC ACID LACTAMS AND DERIVATIVES
Jean-Marie Ferland, Montreal, Quebec, and Yvon Lefebvre, Pierrefonds, Quebec, Canada, assignors to American Home Products Corporation, New York, N.Y., a corporation of Delaware
No Drawing. Filed Nov. 2, 1967, Ser. No. 680,007
Int. Cl. C07c 173/10, 167/00; A61k 27/00
U.S. Cl. 260—210.5
32 Claims

ABSTRACT OF THE DISCLOSURE

There are disclosed herein the 3β-hydroxy-, 3β,5-dihydroxy-, 3β,12β-dihydroxy-, 3β,11α-dihydroxy-, and 3β,5-dihydroxy-19-oxo-21-amino - 14β,21 - oxidonorcholan-23-oic acid lactams, their 21-(N-methyl, N-ethyl, N-propyl, N-isopropyl, and N-benzyl) derivatives, their corresponding 3β-tridigitosides, 3β-cymarosyl-glucosides, 3β-cymarosides, and 3-(mixed glucosides) as obtained from naturally occurring starting materials, their 3β-acetoxy, 3β-propionyloxy and 3β-butanoyloxy derivatives, their 3β,12β- and 3β,11α-diacetoxy, dipropionyloxy, and dibutanoyloxy derivatives, and their 3β-(β-d-glucopyranosyl) derivatives. The compounds possess useful cardiotonic properties, and methods for their preparation and use are also given.

---

This invention relates to a novel class of norcholane derivatives, especially the 14β,21-oxidonorcholan-23-oic acid lactams and to a process for preparing the compounds of this invention.

More specifically, this invention relates to a new class of steroids which may be represented by Formula I:

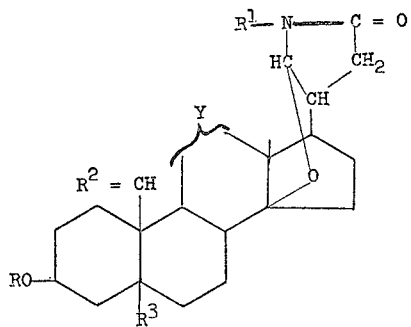

I.

in which $R^1$ represents hydrogen, a lower alkyl group containing from 1–3 carbon atoms, or the benzyl group; $R^2$ represents two atoms of hydrogen or an atom of oxygen; $R^3$ represents hydrogen or the hydroxyl group; and Y represents carbon atoms 11 and 12 of the norcholane nucleus with the substituents attached thereto selected from the groups represented by the following formulae:

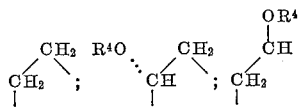

in which R and $R^4$ are selected from the group consisting of, respectively, hydrogen and hydrogen; a hexoside group and hydrogen; a glycosidic group such as found in naturally occurring glycosides, and hydrogen, and lower aliphatic acyl groups, both identical with each other and containing from 2–4 carbon atoms.

The naturally occurring glycosides are used extensively for the treatment of congestive heart failure because of their ability to increase the force of the myocardial contraction. However, those glycosides possess a narrow margin of safety between their therapeutic and toxic doses (e.g. G. K. Moe and A. E. Farah in "The Pharmacological Basis of Therapeutics," L. S. Goodman and A. Gilman, editors, 3rd edition, 1955, pp. 665–698). We have found that the new norcholane derivatives of this invention are able to increase the force of the myocardial contraction with a wider margin of safety than previously obtained with the naturally occurring glycosides. They are therefore useful as cardiotonic drugs and may be administered orally formulated with suitable excepients in form of tablets or capsules containing from 1 to 100 mg. of the active ingredient or by injection in the form of pharmaceutically acceptable sterile solutions or suspensions in pharmaceutically acceptable vehicles containing from 1 to 100 mg. of the active ingredient on a daily basis or as directed by the physician.

The starting material for preparing the compounds of this invention is represented by the Formula II, in which R, $R^2$, $R^3$ and Y are as defined above.

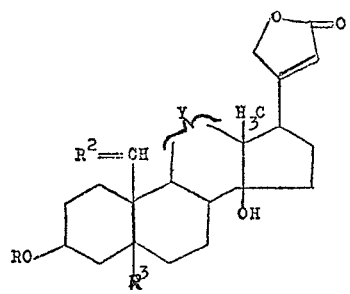

II.

We prefer to use as starting materials for our invention the naturally occurring glycosides such as, for example, digitoxin, digoxin, sarmentocymarose, periplocin, and strophanthin or their corresponding aglycones which are obtained by enzymatic, alkaline or acid hydrolysis as described, for example, by L. F. Fieser and M. Fieser in "Steroids," 1959, pp. 727–809.

The new norcholane derivatives of this invention are readily prepared by reacting the starting materials of Formula II with ammonia or an organic primary amine, such as, for example, methylamine, ethylamine, propylamine, isopropylamine, or benzylamine to obtain the compounds of Formula I in which $R^1$ represents hydrogen, or the methyl, ethyl, propyl, isopropyl, or benzyl group, respectively.

The facile formation of the lactams of this invention may be explained by formation of a lactol intermediate of Formula III.

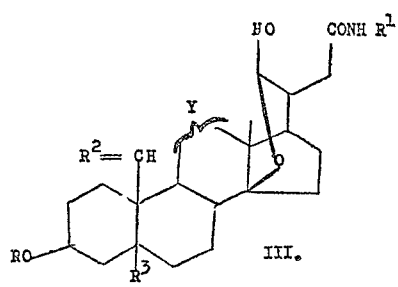

III.

in which R, $R^1$, $R^2$, $R^3$ and Y are as defined previously. The lactam is then formed under the conditions of the reaction of this invention by the attack on $C^{21}$ of the free pair of electrons on the nitrogen atom and concomitant elimination of one molecule of water.

This intermediate of Formula III in which $R^1$ represents hydrogen has actually been isolated and characterized.

In practising the process of this invention we prefer to mix the starting materials of Formula II with the ammonia or the organic primary amine in an inert organic solvent and allow the mixture to react, preferably in a closed vessel, at temperatures ranging from room temperature to 180° C. for a time period ranging from one hour to eight days. We have found that the best procedure for this reaction is to prepare first a solution saturated at 0° C. with the volatile amine reactant in an organic solvent which is inert to the reaction conditions. Such solvents include lower aliphatic alcohols such as, for example, methanol, ethanol, propanol, isopropanol, butanol and t-butanol, aliphatic and cyclic ethers such as, for example, diethyl ether, dioxane or tetrahydrofuran, aromatic hydrocarbons such as, for example, benzene, toluene, or xylene, lower aliphatic halogenated hydrocarbons such as, for example, methylene chloride, chloroform or ethylene dichloride. The less volatile amine, benzyl amine, may be employed directly by diluting it with an equal volume of one of the above inert organic solvents.

The solution of starting material of Formula II in the above described solvents saturated with the above mentioned amine reactant is placed in a closed vessel, or in the case when the amine reactant is benzylamine it has been found to be just as advantageous to place the reaction mixture in a reaction flask equipped with a reflux condenser.

The temperature and time of the reaction are not critical and may vary from room temperature to the boiling point of the reaction mixture, and from a few hours to a few days. They are chosen to give optimum yields of the products of this invention in a reasonable time period. Most advantageously the reaction mixtures containing ammonia are usually heated at 110° C. for 18 hours; the mixtures containing methylamine, ethylamine, propylamine or isopropylamine are usually allowed to react at room temperature for two days; and the reaction mixtures containing benzylamine are usually heated at 60° C. or at the reflux temperature of the mixture for three days. After the above reaction conditions have been completed the volatile components of the reaction mixture are removed by evaporation and the resultant lactams of Formula I, which are mixtures of two isomers, may be purified by conventional purification methods such as, for example, crystallization.

These two isomers, which we have designated as isomers A and B for the sake of convenience are apparently formed as a result of the introduction of new assymetric centers into the norcholane nucleus at positions 20 and 21. These isomers are distinguished from each other by their difference in physical constants.

These isomers may be easily separated in some cases. For example, the isomeric lactams I, in which R and $R^4$ correspond to an acyl group and $R^1$, $R^2$ and $R^3$ are as defined above, may be separated by chromatography. Subsequent hydrolysis of the ester groups yields the pairs of pure isomeric lactams I, in which R and $R^4$ corresponds to hydrogen and $R^1$, $R^2$ and $R^3$ are as defined above.

Improved yields of the lactams of this invention of Formula I in which R represents hydrogen or a lower aliphatic acyl group are obtained when the crude reaction mixture after evaporation of excess volatile amines and solvents is treated with a dilute aqueous mineral acid such as, for example, hydrochloric or sulfuric acid, in solution in a lower alkanol, such as, for example, methanol. The organic solvent is then evaporated and the residue is diluted with water to obtain the desired lactams of Formula I either by filtration or by extraction with a water-immiscible solvent. They may then be purified as described above.

During the course of this reaction it is unnecessary to protect the 19-aldehyde group when present, for example, the 19-aldehyde group of strophanthidine of Formula II in which R represents hydrogen, $R^2$ represents an oxygen atom, $R^3$ represents a hydroxyl group and Y represents the group —$CH_2$—$CH_2$—. The above mentioned aldehyde group reacts with ammonia or the organic primary amine to form a Schiff base; however, the aldehyde group may be conveniently regenerated by treating the Schiff base with dilute hydrochloric or sulfuric acid in methanol solution for a short period of time, for example, for five minutes. The solution is then diluted with saturated salt solution and extracted with chloroform. The chloroform extract is washed with additional saturated salt solution, and then concentrated to afford the desired lactams, which may be purified in the manner described above.

Alternatively the 19-aldehyde group may be protected against Schiff base formation during the reaction by means of a temporary protecting group. Such temporary protection is advantageously afforded, for example, by the ethylenedioxy group which may be easily introduced by reacting the compound containing a reactive oxo group with ethylene glycol in the presence of a small amount of p-toluenesulfonic acid as described by Linger et al. in Arzneimittelforschung, vol. 13, p. 142 (1963). Said protective ethylenedioxy group may be readily removed after completion of the reaction by subjecting the ethylenedioxy-substituted compound to hydrolysis with dilute hydrochloric or sulfuric acid in methanol solution.

The above novel norcholane derivatives of Formula I which possess hydroxyl groups at positions 3, 11 or 12 such as, for example, the norcholane derivatives of Formula I obtained from digitoxigenin, digoxigenin or sarmentogenin may be acylated by treatment with an appropriate lower aliphatic acid anhydride or halide in pyridine to afford the corresponding acylated derivatives of Formula I. When this reaction is carried out at an elevated temperature within the range of from 50° C. to 150° C. with the norcholane derivatives of Formula I in which $R^1$ represents hydrogen, the corresponding acylated derivatives of Formula I in which $R^1$ represents a lower aliphatic acyl group are obtained. As previously mentioned, all of those acylated compounds are mixtures of two isomers which may be separated by chromatography.

Furthermore, the new norcholane derivatives of Formula I, in which R represents hydrogen may be converted to their corresponding 3β-hexosides by reacting them with suitable hexose derivatives, such as, for example, with acetobromoglucose, preferably in dioxan solution, and in the presence of silver oxide and magnesium sulfate, as described by Elderfield et al. in J. Am. Chem. Soc. vol. 69, p. 2235 (1947) or in ethylene dichloride with silver carbonate as described by Zorback et al. in J. Med. Chem. vol. 6, p. 298 (1963). In this manner when using, for example, acetobromoglucose, there are obtained the corresponding 3β-tetraacetyl-d-glucosides of the compounds of this invention of Formula I, in which R represents the tetraacetylglucosyl group. The latter compounds may then be deacylated, preferably with barium methoxide as described by Elderfield et al. cited above, to obtain the corresponding 3β-d-glucosides of this invention.

The following examples will illustrate the scope of this invention.

Example 1

A solution of digitoxin (2.0 g.) in methanol (120 ml.) and water (2 ml.) saturated with ammonia at 0° C. is heated at 110° C. in a Parr bomb for 16 hours. The reaction mixture is evaporated under reduced pressure and the residue is crystallized from methylene chloride-ether to give 3β - tridigitosyl-21-amino-14β,21-oxidonorcholan-23-oic acid lactams, M.P. 244–246° C. (mixture of two isomers).

Similarly, periplocin yields, upon treatment with ammonia as above, 3β-cymarosyl-glucosyl-5-hydroxy-21-amino-14β,21-oxidonorcholan-23-oic acid lactams (mixture of two isomers).

In the same manner a solution of digoxin (2.0 g.) in methanol (120 ml.) and water (2 ml.) saturated at 0° C. with ammonia yields 3β-tridigitosyl-12β-hydroxy-21-amino-14β-21-oxidonorcholan-23-oic acid lactams (mixture of two isomers)

$\nu_{max.}^{CHCl_3}$ 3400, 1695, 1060 cm.$^{-1}$.

Similarly, sarmentocymarose yields 3β-cymarosyl-11α-hydroxy-21-amino - 14β,21 - oxidonorcholan-23-oic acid lactams (mixture of two isomers).

Example 2

A solution of strophanthin (2.0 g.) in methanol (120 ml.) and water (2 ml.) saturated at 0° C. with ammonia is heated at 110° C. in a Parr bomb for 16 hours. The reaction mixture is evaporated, the residue dissolved in methanol (30 ml.), acidified to pH 5 with 0.1 N hydrochloric acid and left at room temperature for five minutes; it is then diluted with water, saturated with sodium chloride and stirred with chloroform for 1 hour. The organic layer is then washed with saturated sodium chloride solution, dried and evaporated, to yield 3-(mixed glycosides) of 3β,5-dihydroxy-19-oxo-21-amino-14β,21-oxidonorcholan-23-oic acid lactams (mixture of two isomers) with $\nu_{max.}^{CHCl_3}$ 2710, 1685, 1060 cm.$^{-1}$.

When using the 19-ethylenedioxy derivative of strophanthin as starting material and proceeding as above, the same compound as mentioned above is also obtained.

Example 3

A solution of digitoxin (2.0 g.) in methanol (100 ml.) and water (2 ml.) saturated with methylamine at 0° C. is lift in a well stoppered flask at room temperature for 48 hours. The solution is evaporated under reduced pressure and the solid obtained is crystallized from methylene chloride-ether to give 3β-tridigitosyl-21-(N-methylamino)-14β,21-oxidonorcholan-23-oic acid lactams M.P. 228–230° C., (mixture of two isomers).

Similarly periplocin yields upon treatment with methylamine as above 3β-cymarosyl-glucosyl-5-hydroxy-21 - (N-methylamino)-14β,21-oxidonorcholan-23-oic acid lactams (mixture of two isomers).

Similarly digitoxin or periplocin yield respectively, upon treatment with ethylamine, propylamine, isopropylamine or benzylamine 3β-tridigitosyl-21-(N-ethylamino)-, -21-(N-propylamino)-, -21-(N-isopropylamino)-, or -21-(N-benzylamino)-14β,21-oxidonorcholan-23-oic acid lactams and 3β-cymarosyl-glucosyl-5-hydroxy-21-(N-ethylamino)-, -21-(N-propylamino)-, -21-(N-isopropylamino)-, or -21-(N-benzylamino)-14β,21-oxidonorcholan-23-oic acid lactams. All the above compounds are obtained as mixtures of two isomers.

In the same manner digoxin yields 3β-tridigitosyl-12β-hydroxy-21-(N-methylamino) - 14β,21 - oxidonorcholan-23-oic acid lactams, M.P. 165–175° C., after crystallization from isopropyl alcohol-isopropyl ether and hexane.

Similarly sarmentocymarose yields upon treatment with methylamine 3β-cymarosyl-11α-hydroxy-21 - (N-methylamino)-14β,21-oxidonorcholan-23-oic acid lactams.

Similarly, digoxin and sarmentocymarose yield, respectively, upon treatment with ethylamine, propylamine, isopropylamine, or benzylamine 3β-tridigitosyl-12β-hydroxy-21-(N-ethylamino)-, -21-(N-propylamino)-, -21-(N-isopropylamino)-, and -21-(N-benzylamino) - 14β,21-oxidonorcholan-23-oic acid lactams, and 3β-cymarosyl-11α-hydroxy-21-(N-ethylamino)-, -21-(N-propylamino)-, -21-(N-isopropylamino)-, and -21-(N-benzylamino)-14β,21-oxidonorcholan-23-oic acid lactams.

All the above compounds are obtained as mixtures of two isomers.

Example 4

A solution of strophanthin (2.0 g.) in methanol (100 ml.) and water (4 ml.) saturated at 0° C. with methylamine is left at room temperature in a well stoppered flask for 48 hours. The solution is evaporated, the solid redissolved in methanol acidified to pH 5 with 0.01 N aqueous hydrochloric acid and left at room temperature for 5 minutes. The mixture is diluted with water, saturated with sodium chloride and stirred with chloroform for 1 hour. The organic solution is washed with saturated sodium chloride solution, dried, and evaporated to yield 3-(mixed glycosides) of 3β,5-dihydroxy-19-oxo-21 - (N-methylamino)-14β-21-oxidonorcholan-23-oic acid lactams $\nu_{max.}^{CHCl_3}$ 2710, 1690 cm.$^{-1}$.

The same compounds are also obtained when the 19-ethylenedioxy derivative of strophanthin is used as starting material.

Similarly, strophanthin and its 19-ethylenedioxy derivative yield, respectively, on treatment with ethylamine, propylamine or isopropylamine 3-(mixed-glycosides) of 3β,5 - dihydroxy-19-oxo-21-(N-ethylamino)-, -21-(N-propylamino)-, and 21 - (N-isopropylamino) - 14β,21-oxidonorcholan-23-oic acid lactams (mixtures of two isomers in each case).

Example 5

A solution of digitoxigenin (9.6 g.) in methanol (500 ml.) saturtaed with ammonia at 0° C. is heated at 110° C. in a Parr bomb for 18 hours. The mixture is evaporated to dryness. The residue is dissolved in ethanol (500 ml.) and boiled with 2 percent sulfuric acid (5 ml.) for 10 minutes. The mixture is evaporated under reduced pressure to one quarter of its initial volume, poured into saturated sodium chloride solution and extracted with chloroform. The organic phase is washed with saturated sodium chloride solution, dried, and evaporated to yield 3β-hydroxy-21-amino-14β,21-oxidonorcholan-23-oic acid lactams (mixture of two isomers), M.P. 254–256° C. When the above reaction is carried out at room temperature for a period of time of 8 days followed by evaporation of excess ammonia and of the solvent, the intermediate lactol, 3β,21-dihydroxy-14β,21-oxidonorcholan-23-oic acid amide (mixture of two isomers) is obtained and is characterized by $\nu_{max.}^{CHCl_3}$ 3600, 1690 cm.$^{-1}$. The latter compound, when heated or treated with acid as described above yields 3β-hydroxy-21 - amino - 14β,21-oxidonorcholan-23-oic acid lactams (mixture of two isomers) identical with the product described above.

Similarly, periplogenin yields 3β,5-dihydroxy-21-amino-14β,21 - oxidonorcholan-23 oic acid lactams (mixture of two isomers).

In the same manner, gitoxigenin yields 3β,12β-dihydroxy - 21 - amino - 14β,21 - oxidonorcholan-23-oic acid lactams (mixture of two isomers)

$\nu_{max.}^{CHCl_3}$ 3600, 3400, 1696 cm.$^{-1}$.

Again in the same manner, sarmentogenin or strophanthidin, or the 19-ethylenedioxy derivative of strophanthidin yield, respectively, 3β,11α-dihydroxy-21-amino-14β,21-oxidonorcholan-23-oic acid lactams or 3β-5-dihydroxy-19 - oxo - 21 - amino - 14β,21-oxidonorcholan-23-oic acid lactams (both compounds are obtained as mixtures of two isomers).

Example 6

In the same manner as described in Example 5, but using methylamine at room temperature in a closed vessel for 48 hours digitoxigenin yields 3β-hydroxy-21-(N-methylamino)-14β,21-oxidonorcholan-23-oic acid lactams $\nu_{max}^{CHCl_3}$ 3600, 1690 cm.$^{-1}$.

Similarly, periplogenin, digoxigenin, sarmentogenin, strophanthidin or the 19-ethylenedioxy derivatives of strophanthidin yield, respectively, 3β-5-dihydroxy-21-(N-methylamino) - 14β,21 - oxidonorcholan-23-oic acid lactams, 3β,12β-dihydroxy - 21 - (N-methylamino)-14β,21-oxidonorcholan-23-oic acid lactams, 3β,11α-dihydroxy-21-(N-methylamino)-14β,21-oxidonorcholan - 23 - oic acid lactams and 3β,5-dihydroxy-19-oxo-21-(N-methylamino)-14β,21-oxidonorcholan-23-oic acid lactams.

Similarly, digitoxigenin, periplogenin, digoxigenin, sarmentogenin, strophanthidin, or its 19-ethylenedioxy derivative yield, respectively, upon treatment with ethylamine, propylamine or isopropylamine 3β - hydroxy-21-(N-ethylamino)-, -21-(N-propylamino)-, or -21 - (N - isopropylamino)-14β,21-oxidonorcholan-23-oic acid lactams, 3β,5-dihydroxy-21-(N-ethylamino)-, -21-(N-propylamino)-, or -21-(N-isopropylamino) - 14β,21 - oxidonorcholan-23-oic acid lactams, 3β,12β-dihydroxy-21 - (N - ethylamino)-21-(N-propylamino)-, or -21-(N - isopropylamino) - 14β,21-oxidonorcholan-23-oic acid lactams, 3β,11α-dihydroxy-21-(N-ethylamino)-, -21-(N-propylamino)-, or -21-(N - isopropylamino)-14β,21-oxidonorcholan-23-oic acid lactams, 3β,5-dihydroxy-19-oxo-21-(N-ethylamino)-, -21-(N - propylamino)-, or -21-(N-isopropylamino) - 14β,21 - oxidonorcholan-23-oic acid lactams.

All the above compounds are obtained as mixtures of two isomers.

Example 7

A solution of digitoxigenin (1.89 g.) in methanol (100 ml.) and benzylamine (100 ml.) is refluxed for 72 hours. After cooling the solvent is evaporated under reduced pressure, the remaining solution is poured into ice water, acidified, to pH 3 with 50 percent ice-cold sulfuric acid, and left at room temperature for ½ hour. The mixture is saturated with sodium chloride and extracted with chloroform, washed with saturated sodium chloride solution, dried, and evaporated to yield 3β-hydroxy-21-(N-benzylamino)-14β,21-oxidonorcholan-23-oic acid lactams $\nu_{max}^{CHCl_3}$ 3600, 1680, 1590, 1580 cm.$^{-1}$.

In the same manner, periplogenin, digoxigenin, sarmentogenin, strophanthidin or the 19-ethylenedioxy derivative of strophanthidin yield, respectively, 3β,5-dihydroxy-21-(N-benzylamino) - 14β,21 - oxidonorcholan-23-oic acid lactams, 3β,12β-dihydroxy-21-(N-benzylamino)-14β,21-oxidonorcholan-23-oic acid lactams, 3β,11α-dihydroxy-21-(N-benzylamino) - 14β,21 - oxidonorcholan-23-oic acid lactams, and 3β,5-dihydroxy-19-oxo-21-(N-benzylamino)-14β,21-oxidonorcholan-23-oic acid lactams.

All the above compounds are obtained as mixtures of two isomers.

Example 8

A solution of 3β - hydroxy-21-amino-14β,21-oxidonorcholan-23-oic acid lactam (9.0 g.), obtained as described in Example 5 in pyridine (45 ml.) and acetic anhydride (23 ml.) is allowed to stand overnight at room temperature. The solution is poured into ice-cold water, saturated with sodium chloride and extracted with chloroform. The organic layer is washed with 2% sulfuric acid, 5% sodium carbonate, and saturated sodium chloride solution, dried and evaporated to give an oil which is chromatographed on silica gel. The fractions eluted with a mixture of methylene chloride-ethyl acetate (45:55) contain a mixture of the two isomeric lactams. The fractions richer in the less polar isomer, as shown by thin-layer chromatography in isopropanol/benzene (15:85) are combined and crystallized from methylene chloride-ether to give the isomer A of 3β-acetoxy-21-amino-14β,21-oxidonorcholan-23-oic acid lactam, M.P. 227–229° C. The fractions containing predominantly the more polar isomer as shown in the manner described above, are combined and crystallized from methylene chloride-ether to give the isomer B of the above compound, M.P. 256–258° C.

In the same manner but using propionic anhydride or butyryl chloride instead of acetic anhydride, acylation of 3β-hydroxy-21-amino-14β,21-oxidonorcholan-23 - oic acid lactams yields isomers A and B of 3β-propionyloxy and of 3β-butanoyloxy-21-amino-14β,21-oxidonorcholan-23 - oic acid lactams, respectively.

In the same manner 3β-hydroxy-21-(N-methylamino)-, -21-(N-ethylamino)-, -21-(N-propylamino)-, -21-(N-isopropylamino)-, and -21-(N-benzylamino)-14β,21-oxidonorcholan-23-oic acid lactams described in Examples 6 and 7, yield respectively, when treated with acetic anhydride in pyridine solutions, isomers A and B of 3β-acetoxy-21-(N-methylamino)-, (M.P. 242–244° C. and M.P. 212–214° C.)-, -21-(N-ethylamino)-, 21-(N-propylamino)-, 21-(N-isopropylamino)-, and 21-(N-benzylamino)- (M.P. 185–186° C. and M.P. 226–227° C.) -14β,21-oxidonorcholan-23-oic acid lactams. When using propionic anhydride or butyryl chloride instead of acetic anhydride and proceeding as above, isomers A and B of 3β-propionyloxy and 3β-butanoyloxy- 21-(N-methylamino)-, 21-(N-ethylamino)-, 21-(N-propylamino)-, -21-(N-isopropylamino)- and -21 - (N-benzylamino)-14β,21-oxidonorcholan-23-oic acid lactams are also obtained.

Similarly, 3β,5 - dihydroxy-21-amino-, -21-(N-methylamino)-, -21 - (N-ethylamino)-, -21-(N-propylamino)-, -21-(N-isopropylamino)-, and -21-(N-benzylamino)-14β, 21-oxidonorcholan-23-oic acid lactams, described in Examples 5, 6, and 7, yield, upon treatment with acetic anhydride, propionic anhydride, or butyryl chloride, and proceeding in the manner described above, isomers A and B of 3β-acetoxy-, 3β-propionyloxy-, and 3-butanoyloxy-5-hydroxy-21-amino-, 21-(N-methylamino)-, -21-(N-ethylamino)-, -21-(N-propylamino)-, -21-(N-isopropylamino)-, and -21 - (N-benzylamino)-14,21-oxidonorcholan-23-oic acid lactams, respectively.

Similarly, 3β,12β-dihydroxy-21-amino-, -21-(N-methylamino)-, 21-(N-ethylamino)-, -21-(N-propylamino)-, -21-(N-isopropylamino)-, and -21 - (N-benzylamino)-14β,21-oxidonorcholan-23-oic acid lactams as described in Examples 5, 6 and 7, yield, upon treatment with acetic anhydride and proceeding as above isomers A and B of 3β,12β-diacetoxy - 21-amino-(NMR 19-methyl group; 60H, 18-methyl group:62H; 18 and 19-methyl groups:60H), -21-(N-methylamino)-, -21-(N-ethylamino)-, -21-(N-propylamino)-, -21 - (N-isopropylamino)-, and -21-(N-benzylamino)-14β,21-oxidonorcholan-23-oic acid lactams, respectively. When using propionic anhydride or butyryl chloride instead of acetic anhydride and proceeding as above, isomers A and B of 3β,12β-dipropionyloxy- and 3β,12β-dibutanoyloxy-21-amino-, -21-(N-methylamino)-, -21-(N-ethylamino)-, -21 - (N-propylamino)-, -21-(N-isopropylamino)-, and -21 - (N-benzylamino) - 14β,21-oxidonorcholan-23-oic acid lactams are also obtained.

Similarly 3β,11α-dihydroxy-21-amino-, -21-(N-methylamino)-, -21 - (N-ethylamino)-, -21-(N-propylamino)-, -21-(N-isopropylamino)-, and -21-(N-benzylamino)-14β, 21-oxidonorcholan-23-oic acid lactams, also prepared in Examples 5, 6, and 7, yield upon treatment with acetic anhydride, propionic anhydride or butyryl chloride and proceeding in the manner described above, isomers A and B of 3β,11α-diacetoxy-, 3β,11α-dipropionyloxy-, and 3β, 11α-dibutanoyloxy-21-amino-, -21-(N-methylamino)-, -21-(N-ethylamino)-, -21-(N-propylamino)-, -21-(N-isopropylamino)-, and -21-(N-benzylamino)- 14β,21-oxidonorcholan-23-oic acid lactams, respectively.

In the same manner, 3β,5-dihydroxy-19-oxo-21-amino-21-(N-methylamino)-, -21-(N-ethylamino)-, -21-(N-propylamino)-, -21-(N-isopropylamino)-, and -21-(N-benzylamino)-14β,21-oxidonorcholan-23-oic acid lactams, obtained in Examples 5, 6, and 7 yield, upon treatment with acetic anhydride, propionic anhydride, or butyryl chloride and proceeding in the manner described above, isomers A and B of 3β-acetoxy-, 3β-propionyloxy-, and 3β-butanoyloxy - 5 - hydroxy-19-oxo-21-amino-, -21-(N-methylamino)-, -21 - (N-ethylamino)-, -21-(N-propylamino)-, -21-(N-isopropylamino)-, and -21-(N-benzylamino)-14β, 21-oxidonorcholan-23-oic acid lactams, respectively.

Example 9

A solution of isomer B of 3β-acetoxy-21-amino-14β,21-oxidonorcholan-23-oic acid lactam, obtained as described in Example 8, M.P. 256–258° C., (0.50 g.), in potassium carbonate (0.50 g.) methanol, (20 ml.), and water (5 ml.) is refluxed for two hours. The solution is then evaporated under reduced pressure until a solid appears. The mixture is poured into excess 2 percent sulfuric acid, saturated with sodium chloride, extracted with chloroform, washed with saturated sodium chloride solution, dried, and evaporated, yielding isomer B of 3β-hydroxy-21-amino-14β,21-oxidonorcholan-23-oic lactam with M.P. 254–256° C. after crystallization from acetone-ether.

In the same manner, isomer A of the above starting material obtained as described in Example 8 yields isomer A of the above compound.

Again in the same manner, isomers A and B of 3β-acetoxy -21-(N-methylamino)-, -21-(N-ethylamino)-, -21-(N-propylamino)-, -21-(N-isopropylamino)-, and -21-(N-benzylamino)-14β,21-oxidonorcholan-23-oic acid lactams, of 3-acetoxy-5-hydroxy-21-amino-, -21-(N-methylamino)-, -21-(N-ethylamino)-, -21-(N-propylamino)-, -21-(N-isopropylamino)-, and -21-(N-benzlamino)-14β,21-oxidonorcholan-23-oic acid lactams and of 3β-acetoxy-5-hydroxy-19 - oxo-21-amino-, -21-(N-methylamino)-, -21-(N-ethylamino)-, -21 - (N-propylamino)-, -21 - (N-isopropylamino)-, and -21-(N-benzylamino)-14,21-oxidonorcholan-23-oic acid lactams all obtained as described in Example 8, yield isomers A and B of 3β-hydroxy -21-(N-methylamino)-, -21 - (N-ethylamino)-, -21-(N-propylamino)-, -21-(N-isopropylamino)-, and -21-(N-benzylamino)-14β, 21-oxidonorcholan-23-oic acid lactams, of 3,5-dihydroxy-21-amino-, -21-(N-methylamino)-, -21-(N-ethylamino)-, -21-(N-propylamino)-, -21-(N-isopropylamino)-, and -21-(N-benzylamino)-14,21 - oxidonorcholan - 23 - oic acid lactams and of 3β,5-dihydroxy-19-oxo-21-amino-, -21-(N-methylamino)-, -21 - (N-ethylamino)-, -21-(N-propylamino-, -21 - (N-isopropylamino)-, and -22-(N-benzylamino)-14β-,21-oxidonorcholan-23-oic acid lactams, respectively.

Also in the same manner, isomers A and B of 3β,11α-diacetoxy - 21 - amino-, -21 - (N - methylamino)-, -21-(N - ethylamino)-, -21 - (N - propylamino)-, -21 - (N-isopropylamino)-, and -21 - (N - benzylamino) - 14β,21-oxidonorcholan - 23 - oic acid lactams, and of 3β,12β-diacetoxy - 21 - amino-, -21 - (N - methylamino)-, -21-(N - ethylamino)-, -21 - (N-propylamino)-, -21 - (N - isopropylamino)- and -21 - (N - benzylamino) - 14β,21-oxidonorcholan - 23 - oic acid lactams, all obtained as described in Example 8, yield isomers A and B of 3β,11α-dihydroxy - 21 - amino-, -21 - (N - methylamino)-, -21-(N - ethylamino)-, -21-(N - propylamino)-, -21 - (N-isopropylamino)-, and -21 - (N - benzylamino) - 14β,21-oxidonorcholan - 23 - oic acid lactams, and isomers A and B of 3β,12β - dihydroxy - 21 - amino-, -21 - (N-methylamino)-, -21 - (N - ethylamino)-, -21 - (N - propylamino)-, -21 - (N - isopropylamino)- and -21 - (N-benzylamino) - 14β,21 - oxidonorcholan - 23 - oic acid lactams, respectively.

Example 10

A mixture of isomer B of 3β-hydroxy-21-amino-14β,21- oxidonorcholan-23-oic acid lactam (1.0 g.), obtained as described in Example 9, succinic anhydride (1.5 g.) and pyridine (10 ml.) is allowed to stand at room temperature overnight, heated on the steam bath for two hours, cooled, poured into ice-water, and acidified with 10 percent sulfuric acid. The solid obtained is filtered, dried, and crystallized from methylene chloride-ether, to yield isomer B of the 3β - hemisuccinoyloxy - 21 - amino - 14β,21 - oxidonorcholan-23-oic acid lactams, M.P. 265–267° C.

In the same manner, when starting with isomer A of the above starting material, the corresponding 3β-hemisuccinate is also obtained.

Again in the same manner, isomers A and B of 3β-hydroxy - 21 - (N - methylamino)-, -21 - (N - ethylamino)-, -21 - (N - propylamino)-, -21 - (N - isopropylamino)-, and -21 - (N - benzylamino) - 14β,21 - oxidonorcholan-23 - oic acid lactams, all obtained as described in Example 9, yield isomers A and B of the 3β-hemisuccinoyloxy-21-(N-methylamino)- (M.P. 280–282° C.), -21-(N - ethylamino)-, -(21 - N - propylamino)-, -21 - (N-isopropylamino)-, and -21 - (N - benzylamino) - 14β,21-oxidonorcholan - 23 - oic acid lactams, respectively.

Also in the same manner, isomers A and B of 3β,5-dihydroxy-21-amino-, -21-(N-methylamino)-, -21-(N-ethylamino)-, -21-(propylamino)-, -21-(isopropylamino)- and -21 - (N - benzylamino) - 14β,21-oxidonorcholan-23-oic acid lactams and of 3β,5 - dihydroxy - 19 - oxo-21 - amino-, -21 - (N - methylamino)-, -21 - (N-ethylamino)-, -21 - (N - propylamino)-, -21 - (N - isopropylamino)- and -21 - (N - benzylamino) - 14β,21 - oxidonorcholan - 23 - oic acid lactams, described in Example 9, yield isomers A and B of 3β-hemisuccinoyloxy-5-hydroxy-21-amino-, -21-(methylamino)-, -21-(N-ethylamino), -21-(N-propylamino)-, -21-(N-isopropylamino)- and -21-(N-benzylamino)-14β,21 - oxidonorcholan - 23-oic acid lactams and isomers A and B of 3β-hemisuccinoyloxy - 5 - hydroxy - 19 - oxo - 21 - amino-, -21 - (N-methylamino)-, -21-(N-ethylamino)-, -21 - (N - propylamino)-, -21-(N-isopropylamino)- and -21-(N-benzylamino)-14β,21-oxidonorcholan-23-oic acid lactams, respectively.

Similarly, isomers A and B of 3β,11α-dihydroxy-21-amino - 21 - (N - methylamino)-, -21 - (N - isopropylamino)- and -21 - (N - benzylamino) - 14β,21 - oxidonorcholan-23-oic acid lactams and of 3β,12β-dihydroxy 21-amino, -21-(N-methylamino)-, -21-(N-ethylamino-, -21-(N-propylamino)-, -21-(N-isopropylamino)-, and -21-(N-benzylamino)-14β,21-oxidonorcholan-23-oic acid lactams all obtained in Example 9 yield isomers A and B of 3β,11α - dihemisuccinoxyloxy - 21 - amino-, -21 - (N-methylamino)-, -21 - (N - ethylamino)-, -21 - (N - propylamino)-, -21 - (N - isopropylamino)- and -21 - (N-benzylamino) - 14β,21 - oxidonorcholan - 23 - oic acid lactams and of 3β,12β-dihemisuccinoyloxy - 21 - amino-, -21 - (N - methylamino)-, -21 - (N - ethylamino)-, -21-(N - propylamino)-, -21 - (N - isopropylamino)-, and -21 - (N - benzylamino) - 14β,21 - oxidonorcholan - 23-oic acid lactams, respectively.

The sodium salts of all of the above hemisuccinates are prepared by treating the compounds obtained as described above in solution in ethanol with the equivalent amounts of a 10 percent aqueous solution of sodium bicarbonate, followed by evaporation to dryness under reduced pressure.

Example 11

A mixture of isomer A of 3β-acetoxy-21-amino-14β,21-oxidonorcholan - 23 - oic acid lactam prepared as described in Example 8 (125 mg.), acetic anhydride (2 ml.) and pyridine (2 ml.) is heated for 16 hours on the steam bath, cooled, and poured into ice water. The solid obtained is filtered, dried, dissolved in methylene chloride, and chromatographed on silica gel. Elution with 6 percent ethyl acetate in methylene chloride yields isomer A of 3β-acetoxy-21-(N-acetylamino) - 14β,21 - oxidonorcholan- 23-oic acid lactam with M.P. 208–210° C after crystallization from ether.

In the same manner, isomer B of the above starting material, also prepared as described in Example 8, yields, after treatment as above and elution with 25 percent ethyl acetate in methylene chloride, isomer B of the above compound with M.P. 221–223° C. after crystallization from ether.

Again in the same manner, when starting with isomers A or B of 3β-acetoxy-5-hydroxy-, of 3β-acetoxy-5-hydroxy - 19 - oxo-, of 3β,11α - diacetoxy-, and of 3β,12β-diacetoxy - 21 - amino - 14β,21 - oxidonorcholan - 23 - oic acid lactams, obtained in Example 8, isomers A and B or 3β - acetoxy - 5 - hydroxy-, of 3β - acetoxy - 5 - hydroxy-19-oxo-, of 3β,11α-diacetoxy-, and of 3β,12β-diacetoxy- -21 - (N - acetylamino) - 14β,21 - oxidonorcholan - 23 - oic acid lactams are obtained, respectively.

Example 12

A solution of isomer B of 3β-hydroxy - 21 - amino-14β,21-oxidonorcholan-23-oic acid lactam, prepared as described in Example 9, (0.375 g.) in dry dioxan (10 ml.) is stirred at room temperature for one hour with dry silver oxide (0.5 g.) and anhydrous magnesium sulfate (1.0 g.). A solution of acetobromoglucose (0.82 g.), in dioxane (5 ml.) is added dropwise over a period of one hour, and stirring is continued for 24 hours at room temperature.

After working up as described by Elderfield et al. cited above, isomer B of 3β(β-d-tetraacetylglucopyranosyl)-21-amino-14β-21-oxidonorcholan-23-oic acid lactam is obtained.

In the same manner, isomer A of the above starting material yields isomer A of 3β-(β-d-tetraacetylglucopyranosyl)-21-amino-14β,21-oxidonorcholan - 23 - oic acid lactam.

By hydrolysis of the 3β-d-tetraacetylglucopyranosides obtained above, in methanol with approximately 0.05 N barium methoxide, following the procedure of Elderfield et al. cited above, the isomers A and B of 3β-(β-d-glucopyranosyl)-21-amino-14β,21-oxidonorcholan - 23 - oic acid lactams are obtained.

Again in the same manner, when starting with isomers A or B of

3β-hydroxy-21-(N-methylamino)-,
-21-(N-ethylamino)-,
-21-(N-propylamino)-,
-21-(N-isopropylamino)-, or
-21-(N-benzylamino)-14β,21-oxidonorcholan-23-oic acid lactams and proceeding as above via the intermediate 3β-β-d-tetraacetylglucopyranosyl) derivatives, there are obtained isomers A and B of 3β-(β-d-glucopyranosyl)-21-(N-methylamino)-,
-21-(N-ethylamino)-,
-21-(N-propylamino)-,
-21-(N-isopropylamino)-, and
-21-(N-benzylamino)-14β,21-oxidonorcholan-23-oic acid lactams, respectively.

Also in the same manner, when starting with isomers A or B of

3β,5-dihydroxy-21-amino-,
-21-(N-methylamino)-,
-21-(N-ethylamino)-,
-21-(N-propylamino)-,
-21-(N-isopropylamino)-, and
-21-(N-benzylamino)-14β,21-oxidonorcholan-23-oic acid lactams, of 3β,5-dihydroxy-19-oxo-21-amino-,
-21-(N-methylamino)-,
-21-(N-ethylamino)-, -21-(N-propylamino)-,
-21-(N-isopropylamino)-, and
-21-(N-benzylamino)-14β,21-oxidonorcholan-23-oic acid lactams, of 3β,11α-dihydroxy-21-amino-,
-21-(N-methylamino)-,
-21-(N-ethylamino)-,
-21-(N-propylamino)-,
-21-(N-isopropylamino)- and
-21-(N-benzylamino)-14β-,21-oxidonorcholan-23-oic acid lactams, and of 3β,12β-dihydroxy-21-amino-21-(N-methylamino)-,
-21-(N-ethlamino)-,
-21-(N-propylamino)-,
-21-(N-isopropylamino)- and
-21-(N-benzylamino)-14β,21-oxidonorcholan-23-oic acid lactams and proceeding as above via the intermediate 3β-(β-d-tetraacetylglucopyranosyl) derivatives, there are obtained isomers A or B of 3β-(β-d-glucopyranosyl)-5-hydroxy-21-amino-,
-21-(N-methylamino)-,
-21-(N-ethylamino)-,
-21-(N-propylamino)-,
-21-(N-isopropylamino)-, and
-21-(N-benzylamino)-14β,21-oxidonorcholan-23-oic acid lactams, of 3β-(β-d-glucopyranosyl)-5-hydroxy-19-oxo-21-amino-,
-21-(N-methylamino)-,
-21-(N-ethylamino)-,
-21-(N-propylamino)-,
-21-(N-isopropylamino)- and
-21-(N-benzylamino)-14β,21-oxidonorcholan-23-oic acid lactams, of 3β-(β-d-glucopyranosyl)-11α-hydroxy-21-amino-,
-21-(N-methylamino)-,
-21-(N-ethylamino)-,
-21-(N-propylamino)-,
-21-(N-isopropylamino)- and
-21-(N-benzylamino)-14β,21-oxidonorcholan-23-oic acid lactams and of 3β-(β-d-glucopyranosyl)-12β-hydroxy-21-amino-21-(N-methylamino)-,
-21-(N-ethylamino)-,
-21-(N-propylamino)-,
-21-(N-isopropylamino)- and
-21-(N-benzylamino)-14β,21-oxidonorcholan-23-oic acid lactams, respectively.

What is claimed is:
1. Compounds of the formula

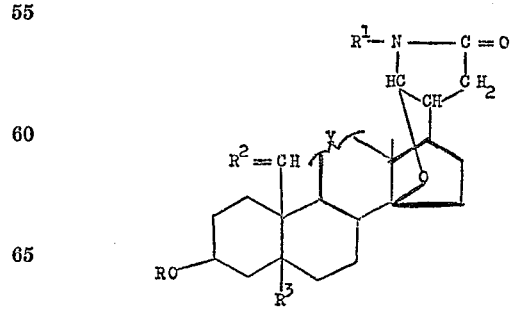

in which $R^1$ represents hydrogen, lower alkyl containing from 1–3 carbon atoms, or benzyl; $R^2$ represents two atoms of hydrogen or an atom of oxygen; $R^3$ represents hydrogen or hydroxyl; and Y represents carbon atoms 11–12 of the norcholane nucleus with substituents attached thereto selected from those represented by the following formulae:

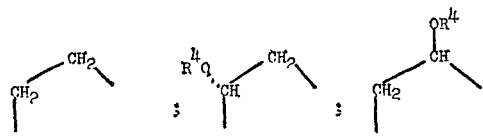

in which R and R⁴ are selected from the group consisting, respectively, hydrogen and hydrogen; hexoside and hydrogen; and a glycosidic group such as found in naturally occurring glycosides and hydrogen; and lower aliphatic acyl, both identical with each other and containing from 2–4 carbon atoms.

2. Compounds of the formula

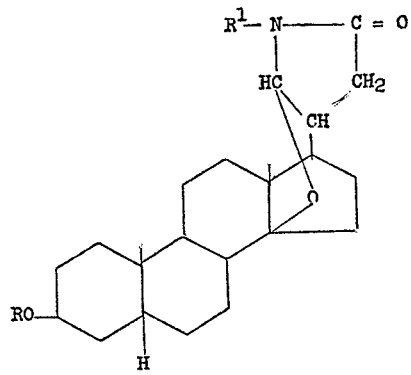

in which R is selected from the group consisting of hydrogen, tridigitosyl, β-d-glucopyranosyl, lower aliphatic acyl containing from 2–4 carbon atoms, and $R^1$ is selected from the group consisting of hydrogen, lower alkyl containing from 1–3 carbon atoms, and benzyl.

3. Compounds of the formula

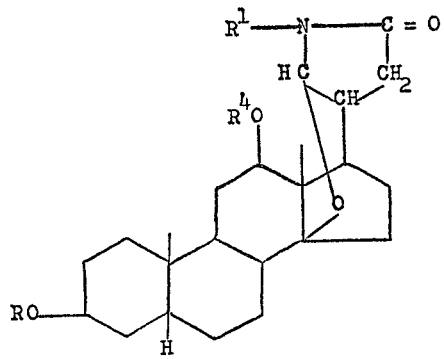

in which R is selected from the group consisting of hydrogen, tridigitosyl, β-d-glucopyranosyl, lower aliphatic acyl containing from 2–4 carbon atoms, and $R^1$ is selected from the group consisting of hydrogen, lower alkyl containing from 1–3 carbon atoms, and benzyl, and $R^4$ is selected from the group consisting of hydrogen and lower aliphatic acyl containing from 2–4 carbon atoms.

4. Compounds of the formula

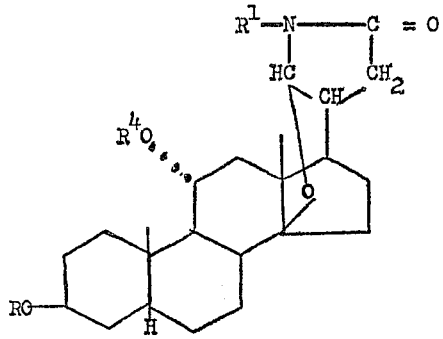

in which R is selected from the group consisting of hydrogen, cymarosyl, β-d-glucopyranosyl, lower aliphatic acyl containing from 2–4 carbon atoms, and $R^1$ is selected from the group consisting of hydrogen, lower alkyl containing from 1–3 carbon atoms, and benzyl, and $R^4$ is selected from the group consisting of hydrogen and lower aliphatic acyl containing from 2–4 carbon atoms.

5. Compounds of the formula

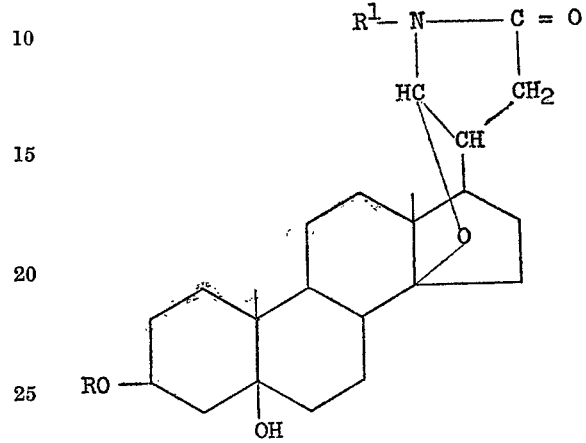

in which R is selected from the group consisting of hydrogen, cymarosyl-glucosyl, β-d-glucopyranosyl, lower aliphatic acyl containing from 2–4 carbon atoms and $R^1$ is selected from the group consisting of hydrogen, lower alkyl containing from 1–3 carbon atoms, and benzyl.

6. Compounds of the formula

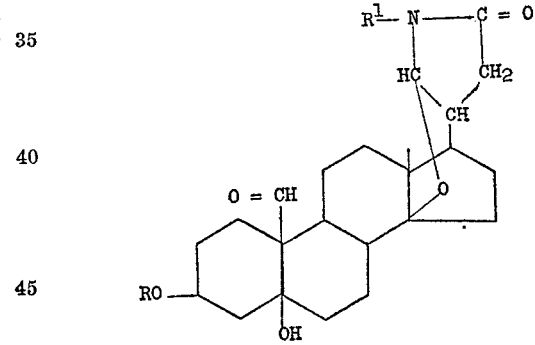

in which R is selected from the group consisting of hydrogen, mixed glucosyl as found in strophanthin, β-d-glucopyranosyl, lower aliphatic acyl containing from 2–4 carbon atoms, and $R^1$ is selected from the group consisting of hydrogen, lower alkyl containing from 1–3 carbon atoms, and benzyl.

7. The process for preparing compounds of the formula

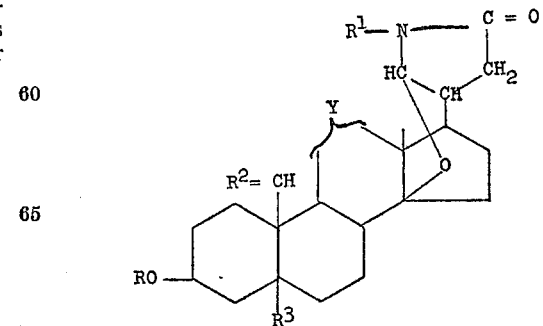

in which $R^1$ represents hydrogen, lower alkyl containing from 1–3 carbon atoms, or benzyl; $R^2$ represents two atoms of hydrogen or an atom of oxygen; $R^3$ represents hydrogen or hydroxyl; and Y represents carbon atoms 11–12 of the norcholane nucleus with substituents attached thereto selected from those represented by the following formulae:

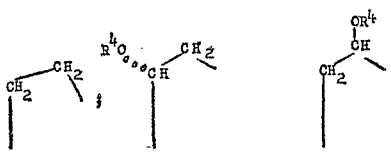

in which R and $R^4$ are selected from the group consisting of, respectively, hydrogen and hydrogen; hexoside and hydrogen; and glycosidic group such as found in naturally occurring glycosides and hydrogen; and lower aliphatic acyl, both identical with each other and containing from 2–4 carbon atoms, which comprises treating a compound of the formula

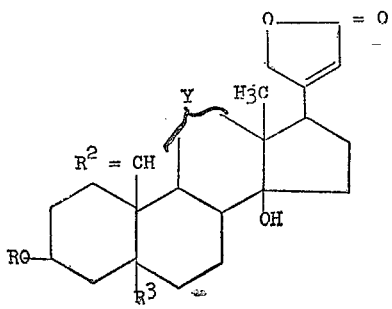

wherein R, $R^2$, $R^3$ and Y are as above defined with an amine selected from the group which comprises ammonia, primary lower aliphatic amines and benzylamine; and isolating the reaction product.

8. $3\beta$ - tridigitosyl - 21-amino-$14\beta$,21-oxidonorcholan-23-oic acid lactams.

9. $3\beta$ - tridigitosyl - $12\beta$ - hydroxy-21 - amino - $14\beta$,21-oxidonorcholan-23-oic acid lactams.

10. 3-(mixed glycosides) of $3\beta$,5-dihydroxy-19-oxo-21-amino-$14\beta$,21-oxidonorcholan-23-oic acid lactams.

11. $3\beta$ - tridigitosyl - 21 - (N-methylamino) - $14\beta$,21-oxidonorcholan-23-oic acid lactams.

12. $3\beta$ - tridigitosyl - $12\beta$ - hydroxy - 21 - (N-methylamino)-$14\beta$,21-oxidonorcholan-23-oic acid lactams.

13. 3-(mixed glycosides) of $3\beta$,5-dihydroxy-19-oxo-21-(N-methylamino)-$14\beta$,21-oxidonorcholan-23-oic acid lactams.

14. $3\beta$ - hydroxy - 21 - amino - $14\beta$,21 - oxidonorcholan-23-oic acid lactams.

15. $3\beta$ - hydroxy - 21 - (N-methylamino) - $14\beta$,21-oxidonorcholan-23-oic acid lactams.

16. $3\beta$,$12\beta$ - dihydroxy - 21 - amino - $14\beta$,21 - oxidonorcholan-23-oic acid lactams.

17. $3\beta$,5 - dihydroxy - 19 - oxo - 21 - amino - $14\beta$,21-oxidonorcholan-23-oic acid lactams.

18. $3\beta$,$12\beta$ - dihydroxy - 21-(N-methylamino)-$14\beta$,21-oxidonorcholan-23-oic acid lactams.

19. $3\beta$,5 - dihydroxy - 19 - oxo - 21 - (N-methylamino)-$14\beta$,21-oxidonorcholan-23-oic acid lactams.

20. $3\beta$ - hydroxy - 21 - (N-benzylamino) - $14\beta$,21-oxidonorcholan-23-oic acid lactams.

21. $3\beta$ - acetoxy - 21 - amino - $14\beta$, 21 - oxidonorcholan-23-oic acid lactams.

22. $3\beta$-acetoxy - 21 - (N-methylamino) - $14\beta$,21-oxidonorcholan-23-oic acid lactams.

23. $3\beta$,$12\beta$ - diacetoxy - 21 - amino - $14\beta$,21 - oxidonorcholan-23-oic acid lactams.

24. $3\beta$,12 - diacetoxy - 21 - (N-methylamino) - $14\beta$,21-oxidonorcholan-23-oic acid lactams.

25. $3\beta$ - acetoxy - 21 - (N-benzylamino) - $14\beta$,21-oxidonorcholan-23-oic acid lactams.

26. $3\beta$ - hemisuccinoyloxy - 21 - amino - $14\beta$,21-oxidonorcholan-23-oic acid lactams.

27. $3\beta$ - hemisuccinoyloxy - 21 - (N-methylamino)-$14\beta$,21-oxidonorcholan-23-oic acid lactams.

28. $3\beta$ - acetoxy - 21 - (N-acetylamino) - $14\beta$,21-oxidonorcholan-23-oic acid lactams.

29. $3\beta$ - ($\beta$-d-glucopyranosyl) - 21 - amino - $14\beta$,21-oxidonorcholan-23-oic acid lactams.

30. $3\beta$ - ($\beta$-d-glucopyranosyl) - 21 - (N-methylamino)-$14\beta$,21-oxidonorcholan-23-oic acid lactams.

31. $3\beta$ - ($\beta$-d-glucopyranosyl) - $12\beta$ - hydroxy - 21-amino-$14\beta$,21-oxidonorcholan-23-oic acid lactams.

32. $3\beta$ - ($\beta$-d-glucopyranosyl) - $12\beta$ - hydroxy - 21-(N-methylamino)-$14\beta$,21-oxidonorcholan-23-oic acid lactams.

References Cited

UNITED STATES PATENTS 3,177,200    4/1965    Meyer _____ 260—210.5

LEWIS GOTTS, Primary Examiner

JOHNNIE R. BROWN, Assistant Examiner

U.S. Cl. X.R.

260—239.55, 999

PO-1050
(5/69)

UNITED STATES PATENT OFFICE
CERTIFICATE OF CORRECTION

Patent No. 3,462,413      Dated August 19, 1969

Inventor(s) Jean-Marie Ferland and Yvon Lefebvre

It is certified that error appears in the above-identified patent and that said Letters Patent are hereby corrected as shown below:

In the title, "14,21-" should read --14β,21--.

In column 1, second formula,

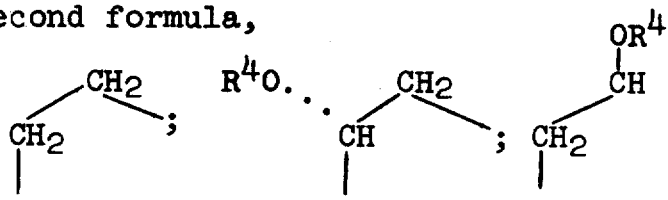

should read,

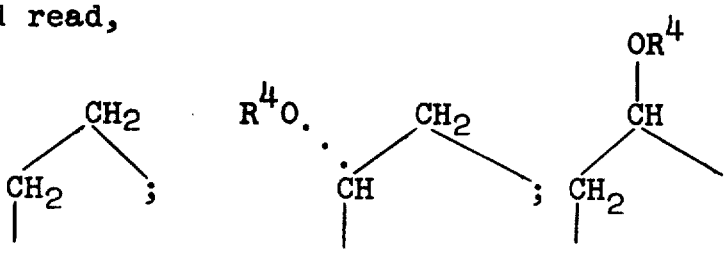

In column 16, claim 24, "3β,12" should read --3β,12β--.

SIGNED AND
SEALED
DEC 30 1969

(SEAL)
Attest:

Edward M. Fletcher, Jr.
Attesting Officer

WILLIAM E. SCHUYLER, JR.
Commissioner of Patents